US008380576B2

United States Patent
Callahan et al.

(10) Patent No.: US 8,380,576 B2
(45) Date of Patent: Feb. 19, 2013

(54) VALUE DETERMINATION FOR MOBILE TRANSACTIONS

(75) Inventors: David S. Callahan, Everett, WA (US); Marius Ionescu, Kirkland, WA (US); Srivaths B. Copparam, Issaquah, WA (US); Vijay Narula, Bellevue, WA (US); Sirius Kuttiyan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 12/701,192

(22) Filed: Feb. 5, 2010

(65) Prior Publication Data

US 2011/0196761 A1    Aug. 11, 2011

(51) Int. Cl.
*G06Q 30/00* (2012.01)
(52) U.S. Cl. ...... 705/26.1; 705/1; 705/14.41; 705/27.1; 705/17; 705/39; 455/405; 455/407; 455/466
(58) Field of Classification Search .................. 705/1.1, 705/14.41, 26.1, 27.1, 17, 39; 455/405, 407, 455/466
See application file for complete search history.

(56) References Cited

U.S. PATENT DOCUMENTS

| 5,623,662 | A | 4/1997 | McIntosh | |
|---|---|---|---|---|
| 6,968,175 | B2 | 11/2005 | Raivisto et al. | |
| 7,505,962 | B2 | 3/2009 | Shariff et al. | |
| 7,580,858 | B2 | 8/2009 | Almeida | |
| 2007/0287413 | A1* | 12/2007 | Kleitsch et al. | 455/405 |
| 2008/0040267 | A1 | 2/2008 | Krishnamoorthy et al. | |
| 2008/0154719 | A1* | 6/2008 | Gounares et al. | 705/14 |
| 2008/0300974 | A1 | 12/2008 | Bhandari et al. | |
| 2008/0306782 | A1* | 12/2008 | Ephrati | 705/7 |
| 2009/0106149 | A1* | 4/2009 | Bennett et al. | 705/42 |
| 2009/0197582 | A1 | 8/2009 | Lewis et al. | |
| 2009/0318113 | A1* | 12/2009 | Waller | 455/407 |
| 2010/0030578 | A1* | 2/2010 | Siddique et al. | 705/3 |

FOREIGN PATENT DOCUMENTS

| KR | 1020040054445 A | 6/2004 |
|---|---|---|
| KR | 1020060114032 A | 11/2006 |
| KR | 1020080053344 A | 6/2008 |
| WO | WO-2011097068 | 8/2011 |

OTHER PUBLICATIONS

Chai, et al., "A Survey of Revenue Sharing Social Software's Systems", Retrieved at <<http://mundanetechnologies.com/goings-on/workshop/melbourne/papers/ChaiPotdarChang.pdf>> 2007, pp. 4.

(Continued)

*Primary Examiner* — Yogesh C Garg
(74) *Attorney, Agent, or Firm* — Wolfe-SBMC (57) ABSTRACT

Various embodiments provide techniques for determining a value share of a mobile transaction for one or more entities associated with the mobile transaction. Examples of mobile transactions include purchases of content such as applications, games, video, audio, graphics, and so on. In one or more embodiments, value share rules can be created and reconfigured. The value share rules specify a share of a transaction value (e.g., a percentage of revenue generated from a purchase of content) that an entity involved in a particular mobile transaction is credited with. In one example scenario, a user of a mobile device purchases an application for the mobile device. A value share rule can be applied to the application purchase amount to determine a share of the application purchase amount that is to be credited to a mobile operator that provides service for the mobile device.

20 Claims, 7 Drawing Sheets

OTHER PUBLICATIONS

Chen, et al., "Decentralized Supply Chain Coordination with Revenue Sharing Mechanism: Transfer Pricing Heuristics and Revenue Share Rates", Retrieved at <<http://www.knu.edu.tw/lecture/2008%20APIEMS(BALI)/PAPER/42-125.pdf>> In the proceedings of the 9th Asia Pacific Industrial Engineering & Management Systems Conference, Dec. 2-5, 2008, pp. 313-320.

He, et al., "Pricing and Revenue Sharing Strategies for Internet Service Providers", Retrieved at <<http://walrandpceecs.berkeley.edu/Papers/jsac.he&walrand.pdf>> May 2006, vol. 24, No. 5, pp. 28.

"International Search Report", Mailed Date: Sep. 23, 2011, Application No. PCT/US2011/021598, Filed Date: Jan. 19, 2011, pp. 9.

* cited by examiner

General

400

| Transaction Parameter | Example Parameter Value | Impact on Value Share |
|---|---|---|
| Category | Skymarket | Customize by Category (e.g., Go-to-Market, standalone business, and so on.) |
| Pmt Type | Credit Card | Customize by Payment Method |
| Mobile Operator | ABC Carrier | Customize by Mobile Operator |
| Purchase Channel | Device | Customize by how the purchase was made (e.g., mobile device, desktop pc, and so on.) |
| ValShare Code | "Promo Code 1" | Customize by a particular promotional program. |
| Item Type | Games | Customize by type of item. |
| Item ID | (GUID of item) | Customize by particular instances of an item. |

402 404 406

Specific

VALUE DETERMINATION FOR MOBILE TRANSACTIONS

BACKGROUND

Mobile devices present an increasingly common platform for a variety of different functions, such as communication, computing, business, and entertainment. To assist in the performance of these functions, a mobile device can include content that can be experienced via the mobile device. Examples of content can include applications, games, video, audio, graphics, and so on. While some mobile devices can be purchased with pre-loaded content, a burgeoning market has arisen for content that can be purchased and loaded by users of mobile devices.

Several different entities may cooperate to provide access to a mobile marketplace that enables users to locate, select, purchase, and receive content. These entities can include a content producer, a mobile operator, and a mobile marketplace host. The content producer originates or generates content, and can include an entity such as an independent software vendor. The mobile operator provides infrastructure and services to enable wireless communication and data transfer. The mobile operator can include an entity such as a cell phone service provider. The mobile marketplace host provides a market platform whereby content can be presented to users of a mobile device. For example, the mobile marketplace host can include a web-based marketing and purchasing resource (e.g., a website) or other wireless-accessible resource that can present content to users and enable the users to purchase the content.

In one example scenario, a cell phone user subscribes to a cell phone service provided by a particular mobile operator. The cell phone user utilizes a cell phone to run a mobile marketplace application and access a mobile marketplace service via the Internet. The cell phone user then views instances of content presented via the mobile marketplace service and purchases an instance of the content by interacting with the service. The instance of the content was originally generated by a particular content producer and was then marketed and made available for purchase by the mobile marketplace service. The cell phone user then receives and consumes the content on his or her cell phone.

While cooperation of these different entities in creating and maintaining the mobile marketplace can provide a tremendous marketing and purchasing resource, allocating revenue resulting from mobile marketplace transactions can be challenging. Current ways of revenue allocation are typically based on an agreement between the various mobile marketplace entities and simply utilize a static percentage-of-transaction allocation for each of the entities. Such ways of revenue allocation typically cannot account for variations in transaction details or for changes in a revenue allocation agreement between particular mobile marketplace entities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for determining a value share of a mobile transaction for one or more entities associated with the mobile transaction. Examples of mobile transactions include purchases of content such as applications, games, video, audio, graphics, and so on. In one or more embodiments, value share rules are created that each specify a share of a transaction value (e.g., a percentage of revenue generated from a purchase of content) that an entity involved in a particular mobile transaction is credited with. In one example scenario, a user of a mobile device purchases an application for the mobile device. A value share rule can be applied to the application purchase amount to determine a share of the application purchase amount that is to be credited to a mobile operator that provides service for the mobile device.

BRIEF DESCRIPTION OF THE DRAWINGS

The same numbers are used throughout the drawings to reference like features.

DETAILED DESCRIPTION

Overview

Various embodiments provide techniques for determining a value share of a mobile transaction for one or more entities associated with the mobile transaction. Examples of mobile transactions include purchases of content such as applications, games, video, audio, graphics, and so on. In one or more embodiments, value share rules are created that each specify a share of a transaction value (e.g., a percentage of revenue generated from a purchase of content) that an entity involved in a particular mobile transaction is credited with. In one example scenario, a user of a mobile device purchases an application for the mobile device. A value share rule can be applied to the application purchase amount to determine a share of the application purchase amount that is to be credited to a mobile operator that provides service for the mobile device.

In some embodiments, value share rules can be created based on a variety of different mobile transaction parameters. Examples of mobile transaction parameters include a payment method used for a mobile transaction, a particular mobile operator involved with the mobile transaction, a purchase channel used to complete the mobile transaction (e.g., a mobile device, a desktop computer, and so on), a type of content purchased via the mobile transaction, and so on. Thus, for a mobile transaction that includes a specific set of mobile transaction parameters, a particular value share rule can be applied to allot to a particular entity a share of the transaction value.

Various techniques discussed herein can be enabled by a transaction processor that receives mobile transaction information for a particular mobile transaction and applies a value share rule to the transaction information to determine a value share for the particular mobile transaction. According to some embodiments, the transaction processor can provide a dynamic and extensible way to configure value share rules based on value share terms negotiated between entities associated with mobile transactions. These entities can include a mobile operator (e.g., a cell phone and/or wireless data service carrier), a mobile marketplace host (e.g., a mobile marketplace website), a content provider (e.g., an application software vendor), and so on. In some embodiments, the transaction processor can serve as an intermediary between these entities to determine value shares of mobile transactions for each of the entities based on a value share rule.

In the discussion that follows, a section entitled "Operating Environment" describes but one environment in which the various embodiments can be employed. Following this, a section entitled "Example User Interface" describes one example user interface in accordance with one or more embodiments. Next, a section entitled "Example Application of Value Share Rules" describes example value share rules and how the rules can be applied to mobile transactions in accordance with one or more embodiments. Following this, a section entitled "Example Methods" describes example methods in accordance with one or more embodiments. Last, a section entitled "Example System" is provided and describes an example system that can be used to implement one or more embodiments.

Operating Environment

Figure 1:
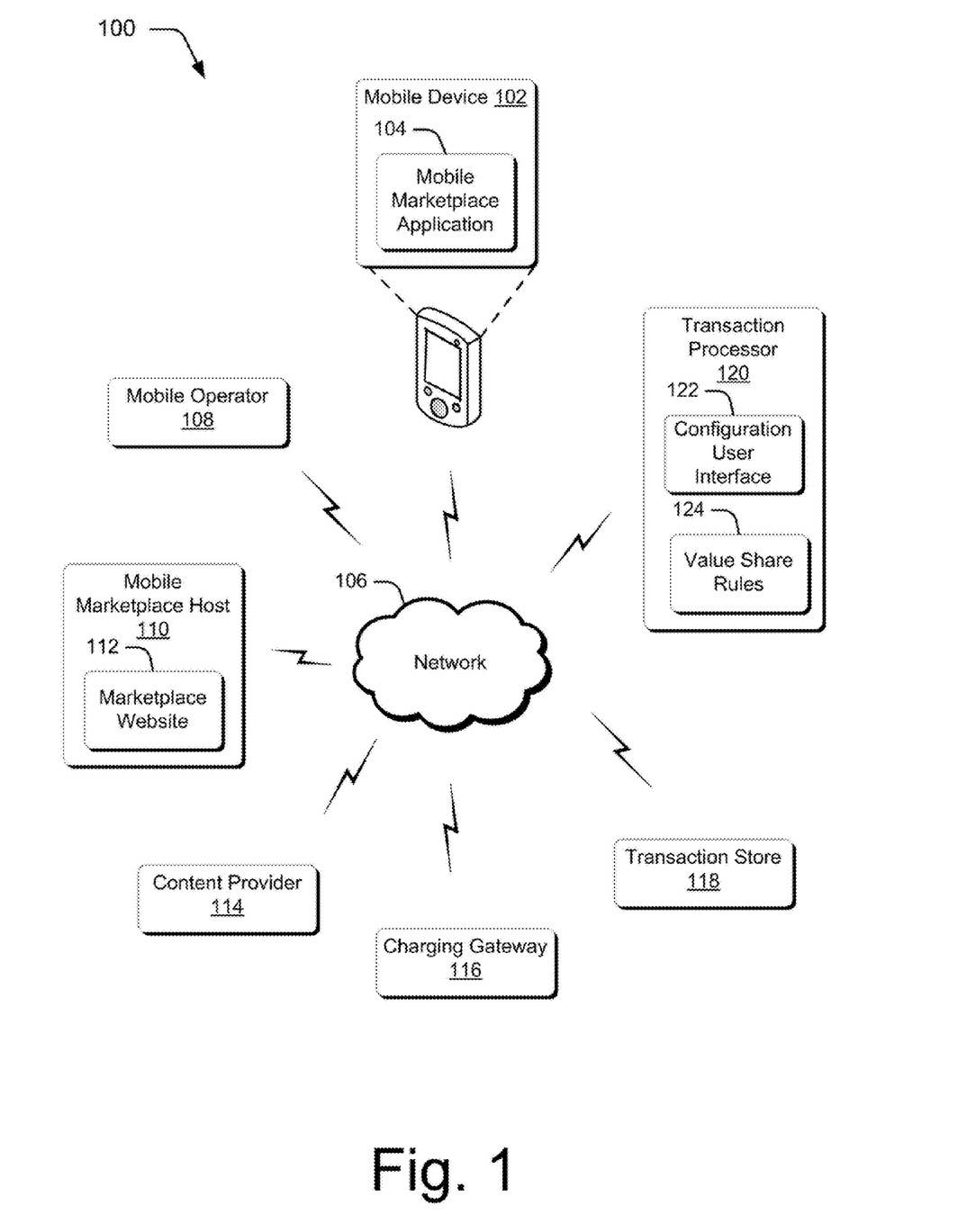
FIG. 1 illustrates an operating environment in which the inventive principles can be employed in accordance with one or more embodiments.

FIG. 1 illustrates an operating environment in accordance with one or more embodiments, generally at 100. Environment 100 includes a mobile device 102 and a mobile marketplace application 104 that resides on the mobile device and is configured to run on the mobile device. According to some embodiments, the mobile device 102 is configured to access a network 106 via a mobile service provided by a mobile operator 108. Examples of the mobile device 102 can include a cell phone, a smart phone, a personal digital assistant, a netbook, a laptop computer, and so on. The network 106 can include any wireless and/or wired network, such as the internet.

The environment 100 also includes a mobile marketplace host 110 that hosts a marketplace website 112. While the mobile marketplace host 110 is discussed with respect to the marketplace website 112, this is not intended to be limiting, and the mobile marketplace website can provide marketplace services directly to the mobile device 102 without requiring the mobile device to access the marketplace website 112.

In some embodiments, the mobile marketplace host 110 can offer a variety of content for purchase (e.g., via the marketplace website 112 or other marketplace service), such as content created and/or generated by a content provider 114. The content provider 114 can include an entity such as a software developer, a media vendor (e.g., video and/or audio), a game developer, and so on. In one example scenario, the mobile device 102 can access the marketplace website 112 and view a selection of content that can be purchased. When an instance of content is purchased from the marketplace website 112 as part of a purchase transaction, the instance of content can then be transferred (e.g., downloaded) to the mobile device 102.

As part of the purchase transaction, a charging gateway 116 receives information about the purchase transaction and applies a charge to an account associated with the mobile device 102 and/or a user of the mobile device 102. Examples of an account can include a bank account, a credit card account, a debit account, an e-commerce account (e.g., PayPal®), and so on. The information about the purchase transaction can then be stored at a transaction store 118. The transaction store 118 can store transaction information for a variety of different entities, such as the mobile operator 108, the mobile marketplace host 110, and so on.

The environment 100 also includes a transaction processor 120 that is configured to receive transaction information, e.g., from the transaction store 118. The transaction processor 120 also includes a configuration user interface 122 that can be used to configure the transaction processor 120 with value share rules 124. A particular value share rule of the value share rules 124 can be applied to a purchase transaction to determine a value share amount of the purchase transaction to be allotted to a particular entity, such as the mobile operator 108, the mobile marketplace host 110, the content provider 114, and so on.

In one example implementation, the mobile operator 108 and the mobile marketplace host 110 negotiate a value share agreement regarding mobile transactions that involve the mobile operator 108 and the mobile marketplace host 110, such as the purchase of content from the marketplace website 112 via the mobile device 102. Included in the value share agreement are business terms that specify a revenue share of purchase transactions for each mobile operator 108 and the marketplace host 110. According to some embodiments, the transaction processor 120 is configured with the business terms (e.g., via the configuration user interface 122) to generate the value share rules 124.

Further to this example implementation, when content is purchased from the marketplace website 112 as part of a purchase transaction, the transaction processor 120 receives information about the purchase transaction and applies one or more of the value share rules 124 to the purchase transaction to determine a revenue share amount of the purchase transaction for each mobile operator 108 and the mobile marketplace host 110. According to some embodiments, each mobile operator 108 and the mobile marketplace host 110 can then be credited with its respective revenue share amount. This particular implementation is presented for purposes of example only, and in some embodiments a value share rule can specify value share for any type and number of entities. Further, value share rules are not limited to revenue share, but may also be configured to determine other value-based properties such as tax rates, regulatory fees, and so on.

While not explicitly illustrated here, but as noted above with respect to the transaction processor 120, one or more of the entities included as part of the operating environment 100 can be implemented in connection with one or more computing devices. One specific example of a computing device is shown and described below in FIG. 7. For example, the transaction processor 120 and its components can be embodied as computer-executable instructions stored on one or more computer-readable storage media and executable by one or more processors to implement various techniques discussed herein.

Having considered an example operating environment, consider now a discussion of an example user interface for implementing one or more of the techniques discussed herein. The example user interface is discussed with reference to environment 100 above.

Example User Interface

Figure 2:
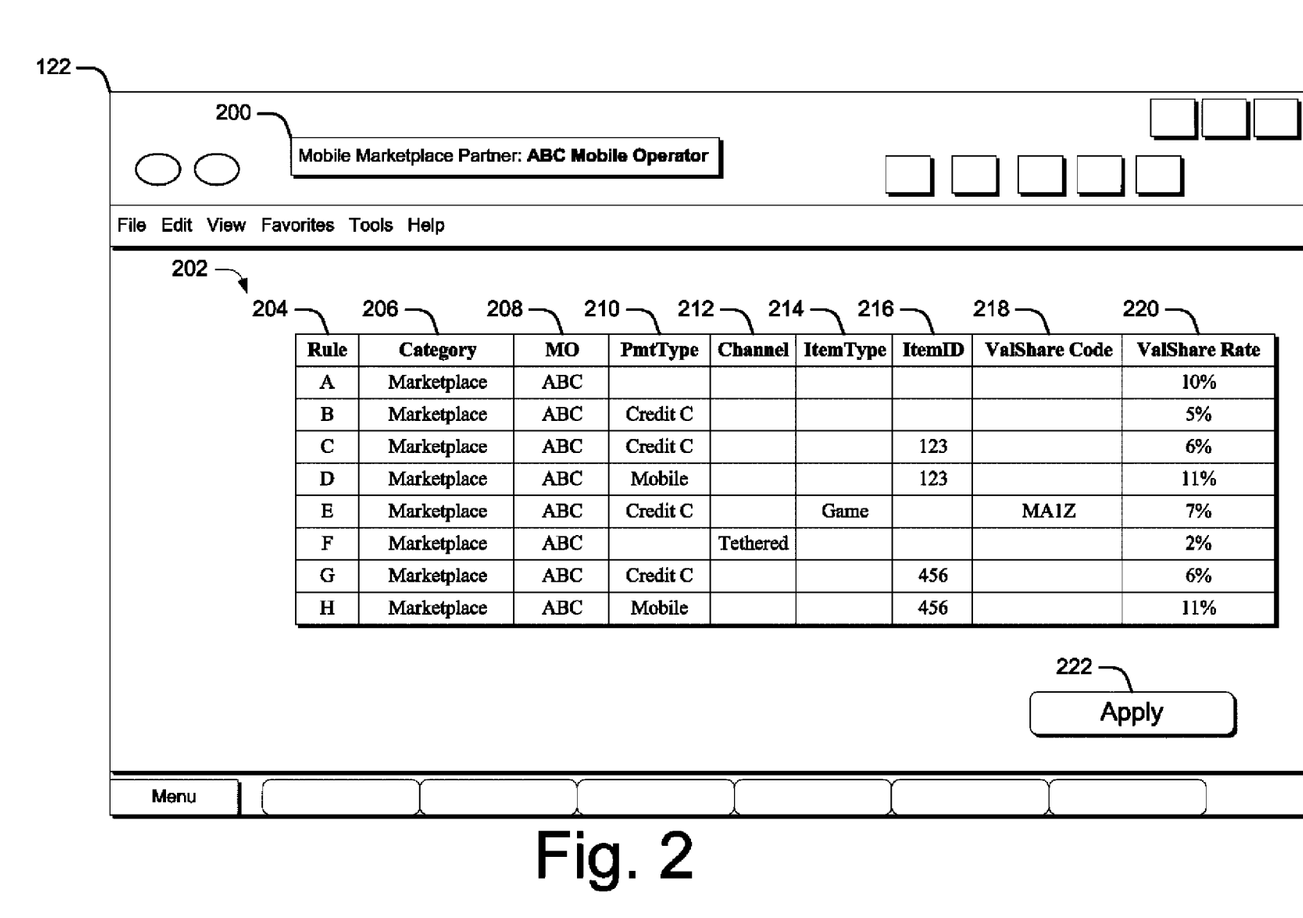
FIG. 2 illustrates an example user interface in accordance with one or more embodiments.

FIG. 2 illustrates one example of the configuration user interface 122 discussed in FIG. 1 in accordance with one or more embodiments. According to some embodiments, the configuration user interface 122 can be associated with one or more of a variety of different applications (e.g., a web browser) and can be displayed by a computing device, such as the computing device shown and described below in FIG. 7.

According to some embodiments, the configuration user interface 122 can be utilized to configure value share rules for one or more entities associated with mobile transactions. The configuration user interface 122 includes an entity menu 200 that is configured to be populated with an entity associated with mobile transactions. For example, particular entities (e.g., the mobile operator 108 and the mobile marketplace host 110) can enter into a value share agreement for mobile transactions. Thus, according to some embodiments, the entity menu 200 can be populated with an entity or entities that are parties to the value share agreement to enable value share rules to be set up according to the value share agreement.

Also in some example embodiments, the configuration user interface 122 can be utilized to configure value share rules for a variety of different entities and different sets of entities. For example, a host entity (e.g., the mobile marketplace host 110) can enter into a different value share agreement with each of several different mobile operators. In some embodiments, the configuration user interface 122 can be used to configure a unique set of value share rules based on each of the different value share agreements. Thus, the configuration user interface 122 can be utilized to configure, reconfigure, and manage multiple different sets of value share rules.

The configuration user interface 122 also includes a rules table 202 that can receive information used to create value share rules. In the illustrated example embodiment, the rules table 202 includes a column for each of a number of rule parameters. Each of the columns includes data fields that can be populated with rule parameter values that can be used to determine value shares of mobile transactions. Rule parameter values can include features and/or characteristics of mobile transactions that can be used to categorize mobile transactions for purposes of determining value share. According to some embodiments, the data fields included as part of the rules table 202 can be populated by direct entry of data (e.g., via a keyboard or other input device) and/or the data fields may include drop-down menus that offer selections of particular rule parameter values. A brief discussion of each of the rule parameters of the rules table 204 is presented below.

Rule ID Parameter 204: This parameter includes an identifier for each of the rules in the rules table 202. The use of letters is for purposes of example only, and any type of identifier can be utilized.

Category Parameter 206: This parameter allows categories to be specified for transactions. According to some embodiments, a category can refer to a particular content market and/or a specific business (e.g., ABC Application Store) in which content is offered for purchase.

Mobile Operator Parameter 208: This parameter allows a particular mobile operator to be specified for a value share rule.

Payment Type Parameter 210: This parameter allows a particular payment type to be specified for a value share rule. Examples of a payment type include credit card, debit card, an e-commerce account (e.g., PayPal®), bank account transfer, and so on. Payment type can also indicate a charge to a mobile operator, which indicates that content can be purchased by charging a mobile service account (e.g., a user's cell phone account) for all or part of the content purchase price.

Channel Parameter 212: This parameter allows a purchase channel to be specified for a value share rule. In some embodiments, the purchase channel can include a device that was used to transact a purchase of content. For example, the device may be a mobile device for which a particular mobile operator provides service. According to some embodiments, other devices may also be utilized, such as a desktop PC or other computing device to which a mobile device can be tethered.

Item Type Parameter 214: This parameter allows an item type to be specified for a value share rule. For example, item type can include a particular category of content that can be purchased, such as applications, games, audio, video, and so on.

Item Identifier Parameter 216: This parameter allows a specific item identifier to be specified for a value share rule. For example, an identifier can be specified for a particular application, game, or other instance of content.

Value Share Code Parameter 218: This parameter allows a value share code to be specified for a value share rule. A value share code can be associated with a promotional program for a particular product, type of product, product source (e.g., a retailer), and so on.

Value Share Rate Parameter 220: This parameter allows a value share rate to be specified for a value share rule. In the illustrated example, the value share rate includes a specific percentage of value for each value share rule. Thus, according to some embodiments, if a value share rule is applied to a transaction, the value share rate can be applied to the transaction amount to determine a share of the transaction amount for a particular entity. Additionally or alternatively, in some embodiments the value share rate parameter 220 can include a flat value amount that is credited to a particular entity for a mobile transaction that qualifies for a particular value share rule.

While not expressly illustrated here, according to some embodiments a value share rule can also include an effective date parameter. The effective date parameter can specify a start date and/or an end date for a value share rule. Thus, in some embodiments, a different value share rule can apply to a particular mobile transaction depending on a transaction date of the particular mobile transaction.

The rule parameters illustrated in the rules table 202 are for purposes of example only, and in some embodiments a variety of other rule parameters may be utilized. Examples of other rule parameters include, by way of example and not limitation, a location where a mobile transaction occurs (e.g., a country, a state, or other geographical zone), a currency utilized in the mobile transaction, a user identifier associated with the mobile transaction and/or a mobile device, and so on.

The configuration user interface 122 also includes an apply button 222. When a value share rule from the rules table 204 is created or reconfigured, the apply button 222 can be activated to cause the new rule or the reconfigured rule to be available to be applied to mobile transactions.

Example Application of Value Share Rules

Figure 3:
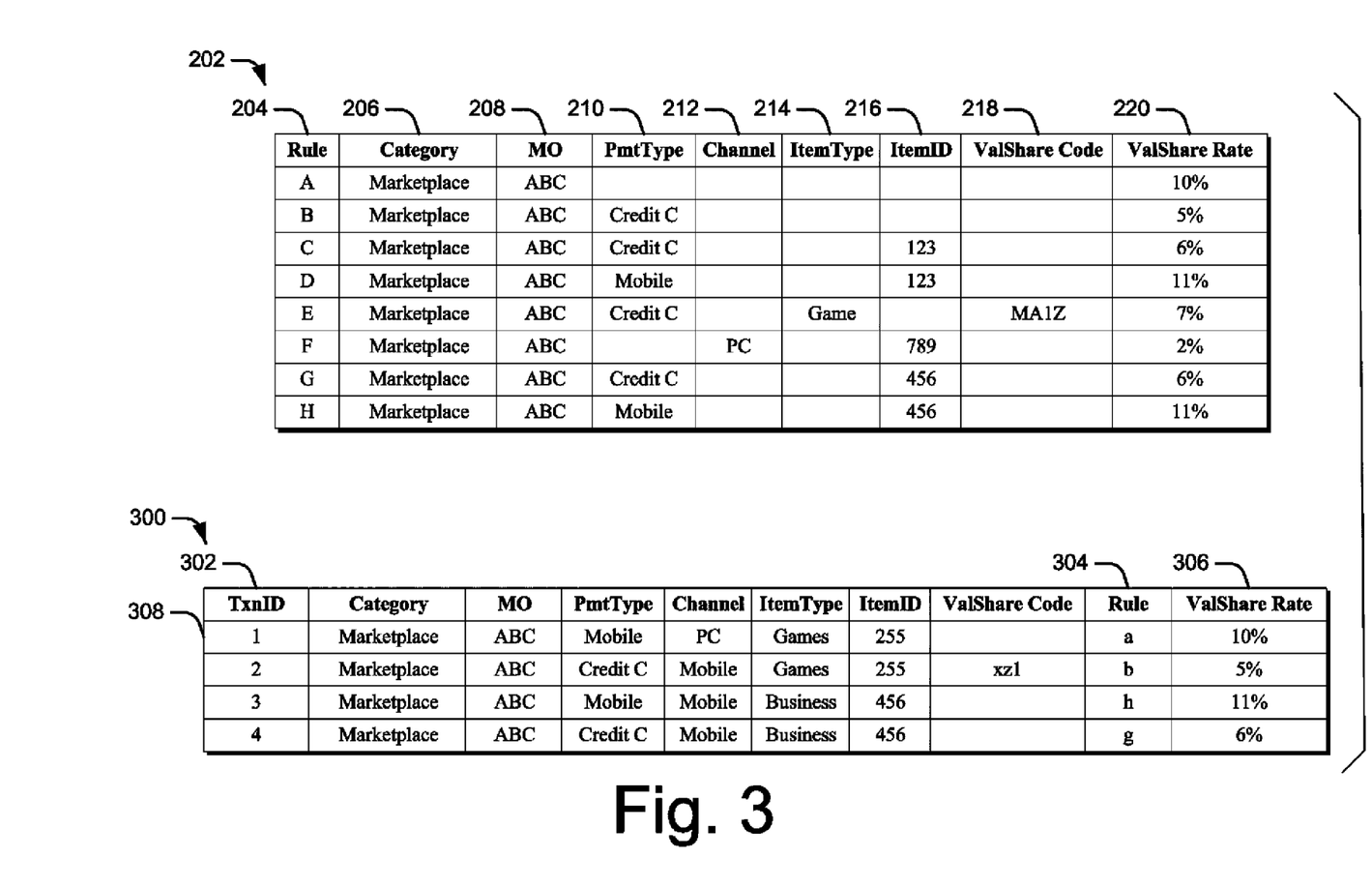
FIG. 3 illustrates an example application of a value share rule in accordance with one or more embodiments.

FIG. 3 illustrates one example of an application of value share rules to mobile transactions in accordance with one or more embodiments. According to some embodiments, the acts discussed with respect to FIG. 3 can be implemented by a computing device, such as the computing device shown and described below in FIG. 7. With reference to environment 100 discussed above and in accordance with some embodiments, the acts discussed with respect to FIG. 3 can be implemented by the transaction processor 120.

For illustration purposes, FIG. 3 includes the rules table 202 discussed above. FIG. 3 also includes a transaction table 300 that lists transaction parameters and transaction parameter values for several example mobile transactions. Transaction table 300 includes a transaction identifier column 302 and a rules column 304. The fields included as part of the transaction identifier column 302 each include an identifier for a particular mobile transaction. The fields included as part of the rules column 304 each include a rule that is applied to determine a value share for a particular mobile transaction.

The transaction table 300 also includes a value share rate column 306 that indicates value share rates that are applied to each of the mobile transactions described in the transaction table 300. The remaining columns include transaction parameters for each of the transactions included in the transaction table 300.

According to some embodiments, a null value for a particular rule parameter value in a value share rule can be interpreted as allowing any value for a particular mobile transaction. For example, with reference to Rule A of the rules table 202, the rule parameter value for the item type parameter 214 is null (e.g., blank). Thus, a particular mobile transaction may be for the purchase of any item type (e.g., games, applications, video, and so on) and still qualify for Rule A.

In some embodiments, a determination of which value share rule to apply to a particular mobile transaction is made based on the most specific match of transaction parameter values to rule parameter values. This aspect of value share determination is discussed in more detail below in the discussion of FIG. 4.

For illustration purposes and in accordance with some embodiments, a transaction 308 included as part of the transaction table 300 will be discussed to explain one example of how a value share rule can be applied to a mobile transaction. Value share rules can be applied to the remaining mobile transactions in the transaction table 300 using a similar process as that discussed below with respect to the transaction 308.

The transaction 308 includes "Marketplace" and "ABC" transaction parameter values, which match all of the rule parameter values for the "Category" and "MO" rule parameters, respectively, in the rules table 204. The transaction 308 also includes a "Mobile" transaction parameter value for the "Payment Type" transaction parameter, which matches the rule parameter values for Rules D and H because their payment type rule values are set to "Mobile," and Rules A and F because their payment type rule values are null and thus allow for any transaction parameter value. The transaction 308 indicates a transaction parameter value of "255" for the "Item ID" transaction parameter. This particular value eliminates Rules D, F, and H, since these rules includes a different rule parameter value for their respective "Item ID" rule parameters. In this example, Rule A is applied to the transaction 308 since its "Item ID" rule parameter value is null and thus allows any item ID value.

Thus, Rule A is the most specific match to the transaction parameter values of the transaction 308. As indicated by Rule A, a value share rate of 10% is applied to the transaction 308. According to some embodiments, the mobile operator ABC would be credited with 10% of the purchase price of content associated with the transaction 308.

Figure 4:
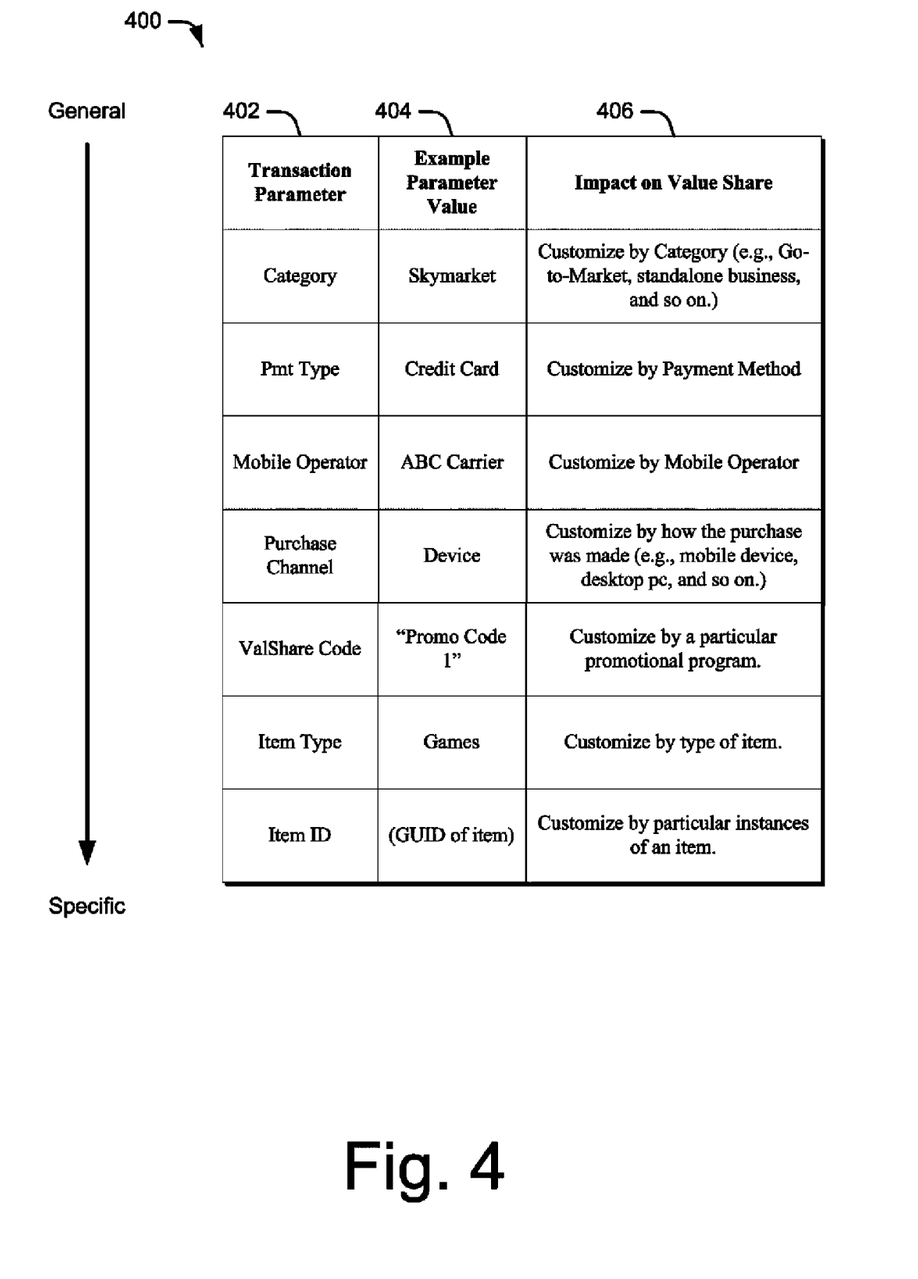
FIG. 4 illustrates an example parameter hierarchy table in accordance with one or more embodiments.

FIG. 4 illustrates generally at 400 an example parameter hierarchy table in accordance with one or more embodiments. The parameter hierarchy table 400 includes a transaction parameter column 402, an example value column 404, and an impact column 406. The transaction parameter column 402 includes example transaction parameters that can be used to determine a value share rule that applies to a particular mobile transaction. The example value column 404 includes example transaction parameter values and the impact column 406 includes examples of how the transaction parameters in the transaction parameter column 402 can be used to create value share rules.

As mentioned above, in some embodiments a determination as to which value share rule applies to a particular mobile transaction is made based on the most specific match of transaction parameter values to rule parameter values. In the parameter hierarchy table 400, the transaction parameters in the transaction parameter column 402 are presented in descending order from the most general ("Category") to the most specific ("Item ID").

For an example application of this concept, see transaction table 300 of FIG. 3, specifically transaction 2. Using the example technique discussed above for applying value share rules to a mobile transaction, Rules A and B could be applied to transaction 2. However, consider embodiments in which the most specific match of transaction parameter values to rule parameter values is used to determine which rule to apply. With reference to Rule A, transaction 2 matches the "Category" and "MO" rule parameter values. With reference to Rule B, however, transaction 2 matches the "Category," "MO," and "PmtType" rule parameter values. Thus, Rule B is the more specific match and is applied to transaction 2.

Example Methods

Figure 5:
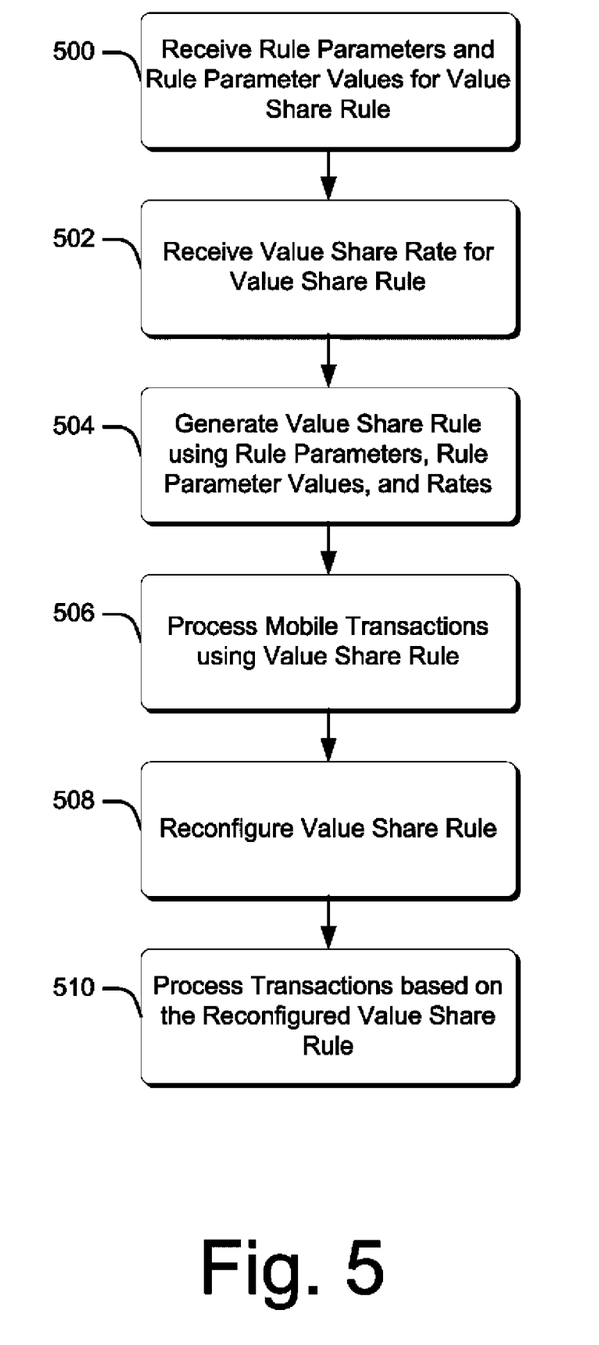
FIG. 5 is a flow diagram that describes steps in a method in accordance with one or more embodiments.

FIG. 5 is a flow diagram that describes a method in accordance with one or more embodiments. The method can be implemented in connection with any suitable hardware, software, firmware, or combination thereof. In at least some embodiments, the method can be implemented by software executing or executable to configure value share rules. For example, the method can be implemented in some embodiments via data entry into the configuration user interface 122 via the example computing device shown and described below in FIG. 7.

Step 500 receives rule parameters and rule parameter values for a value share rule. Example rule parameters, rule parameter values, and value share rules are discussed above. Step 502 receives a value share rate for the value share rule. Step 504 generates the value share rule using the rule parameters, rule parameter values, and the value share rate. According to some embodiments, the value share rule can be configured by activating the apply button 222 of the configuration user interface 122. Step 506 processes mobile transactions using the value share rule. According to some embodiments, a mobile transaction can be processed using one or more of the techniques discussed above to determine a value share rate and/or amount for the mobile transaction.

Step 508 reconfigures the value share rule. In some embodiments, a value share rule can be reconfigured via input to a graphical interface (e.g., the configuration user interface 122) and/or by changing one or more of the rule parameters, the rule parameter values, or the value share rate for the value share rule. Thus, in some embodiments, a value share rule can be dynamically reconfigured "on-the-fly" without having to remove the value share rule from service during the reconfiguration process. Step 510 processes mobile transactions based on the reconfigured value share rule.

Figure 6:
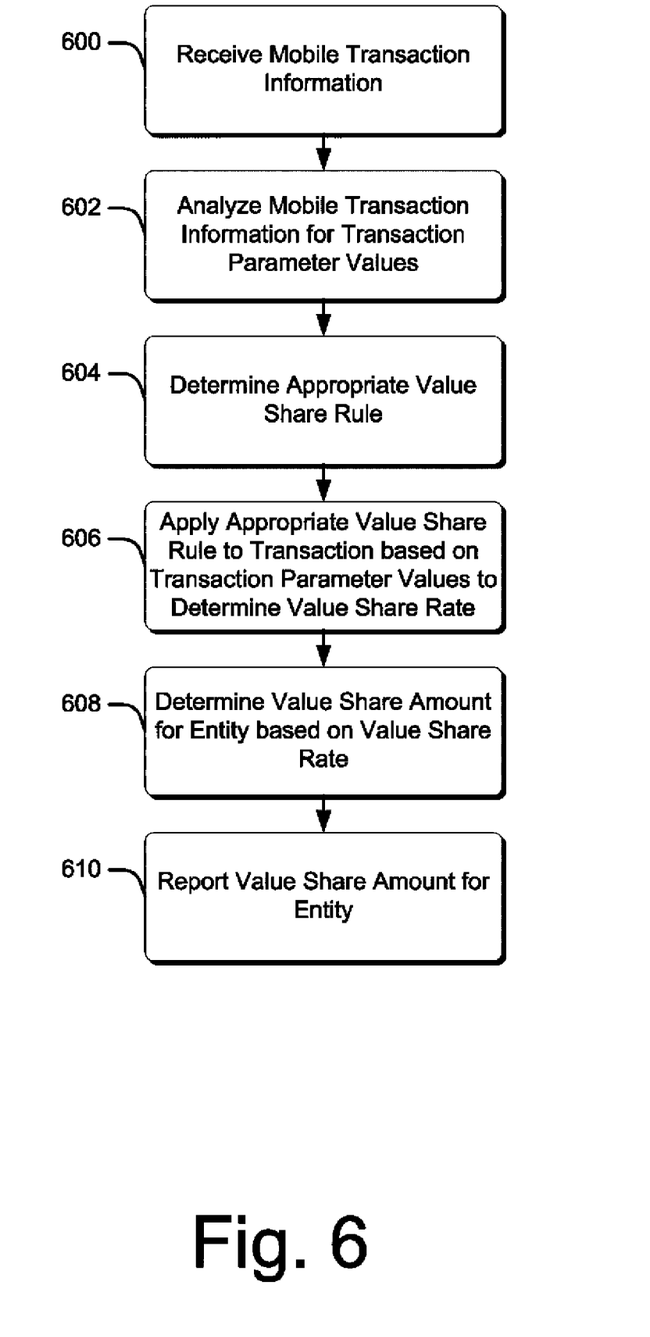
FIG. 6 is a flow diagram that describes steps in a method in accordance with one or more embodiments.

FIG. 6 is a flow diagram that describes a method in accordance with one or more embodiments. The method can be implemented in connection with any suitable hardware, software, firmware, or combination thereof. In at least some embodiments, the method can be implemented by software executing or executable (e.g., utilizing the transaction processor 120) to process mobile transactions.

Step 600 receives information about a mobile transaction. According to some embodiments and with reference to environment 100 discussed above, the transaction processor 120 can receive information about a mobile transaction by pulling the information from the transaction store 118. Step 602 analyzes the information about the mobile transaction to determine transaction parameter values for the mobile transaction. Step 604 determines an appropriate value share rule to apply to the mobile transaction based on the transaction parameter values. Example ways of determining an appropriate value share rule for a particular mobile transaction are discussed above.

Step 606 applies the appropriate value share rule to the mobile transaction based on the transaction parameter values to determine a value share rate. Example ways of applying an appropriate value share rule to a particular mobile transaction are discussed above. While the embodiments mentioned above are discussed with reference to a single value share rate and/or a value share for a single entity, this is not intended to be limiting. In some embodiments, a value share rule can specify multiple different value share rates for multiple entities. Step 608 determines a value share amount for an entity based on the value share rate. For example, in some embodiments the value share rate represents a percentage value. In these embodiments, the percentage value can be applied to a purchase amount for the mobile transaction to determine the value share amount (e.g., a percentage of the purchase amount) for an entity.

Step 610 reports the value share amount for the entity. For example, according to some embodiments the value share amount can be reported to a financial service or financial institution which can credit the entity with the value share amount.

Example System

Figure 7:
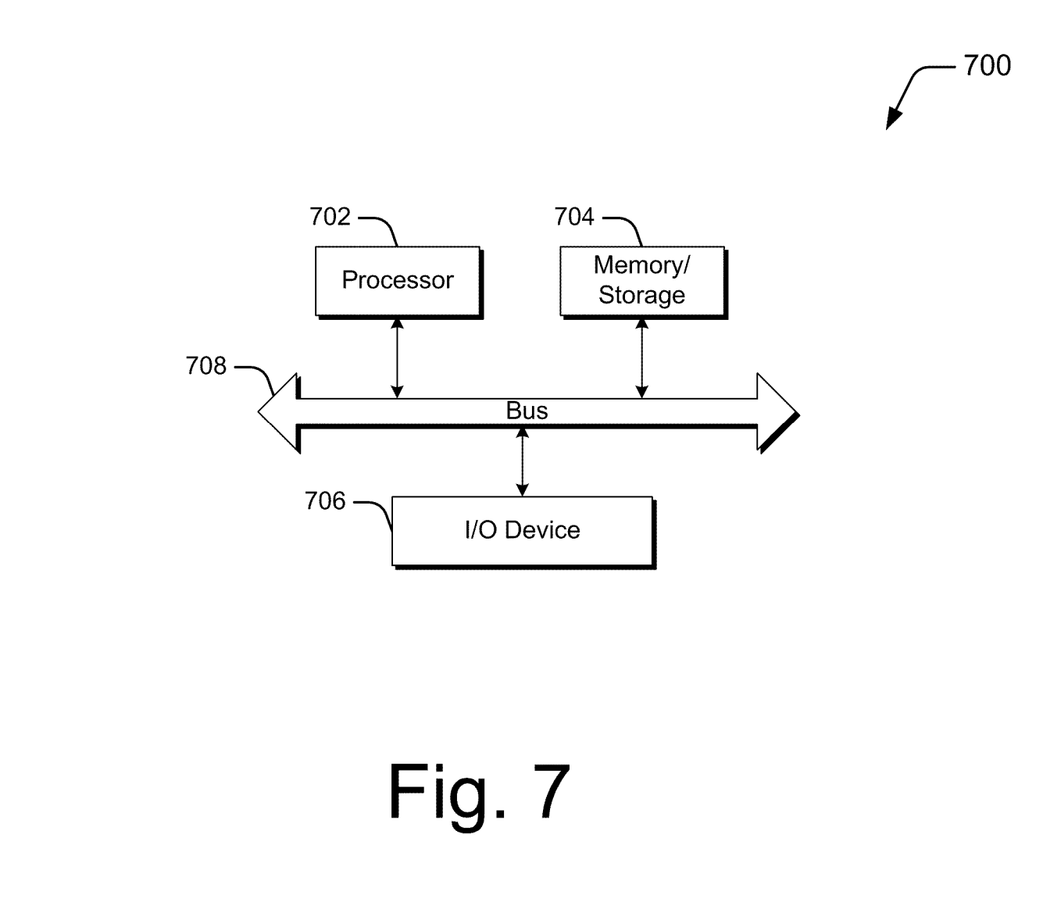
FIG. 7 is a block diagram of a system in accordance with one or more embodiments.

FIG. 7 illustrates an example computing device 700 that can implement various embodiments described above. Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or non-volatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a touch input device (e.g., a touch screen), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide techniques for determining a value share of a mobile transaction for one or more entities associated with the mobile transaction. Examples of mobile transactions include purchases of content such as applications, games, video, audio, graphics, and so on. In one or more embodiments, value share rules are created that each specify a share of a transaction value (e.g., a percentage of revenue generated from a purchase of content) that an entity involved in a particular mobile transaction is credited with. In one example scenario, a user of a mobile device purchases an application for the mobile device. A value share rule can be applied to the application purchase amount to determine a share of the application purchase amount that is to be credited to a mobile operator that provides service for the mobile device.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method comprising:
receiving, by at least one computing device, information pertaining to a mobile transaction;
analyzing, by at least one computing device, the information to determine one or more transaction parameter values of the mobile transaction;
accessing, by at least one computing device, a set of hierarchical value share rules;
determining, by at least one computing device, a value share rule from the set of hierarchical value share rules that applies to the mobile transaction by determining that one or more rule parameter values associated with a determined value share rule from the set of hierarchical value share rules are a more specific match to the one or more transaction parameter values than rule parameter values associated with other value share rules of the set of hierarchical value share rules; and
determining, by at least one computing device, a value share amount of the mobile transaction for an entity by applying the determined value share rule to a value associated with the mobile transaction.

2. The computer-implemented method of claim 1, wherein the mobile transaction comprises a purchase of content via a mobile device.

3. The computer-implemented method of claim 1, wherein the value share amount comprises a percentage of a purchase price of content.

4. The computer-implemented method of claim 1, wherein the value share amount comprises a tax amount for a purchase price of content.

5. The computer-implemented method of claim 1, further comprising dynamically reconfiguring the determined value share rule via input to a graphical interface.

6. The computer-implemented method of claim 1, wherein the one or more rule parameter values associated with the determined value share rule comprise an effective date associated with the value share rule.

7. One or more computer-readable memories embodying computer-executable instructions which when executed by one or more computing devices, cause the one or more computing devices to:
    receive transaction parameter values for a mobile transaction;
    access a set of value share rules;
    determine which value share rule of the set of value share rules is a more specific match to the mobile transaction by:
        comparing one or more rule parameter values for each value share rule of the set of value share rules to the transaction parameter values; and
        determining which value share rule of the set of value share rules includes more rule parameter values that match the transaction parameter values; and
    determine a value share amount of a value of the mobile transaction by applying a determined value share rule to the value of the mobile transaction.

8. The one or more computer-readable memories as recited in claim 7, wherein the determined value share rule is based on a value share agreement between entities associated with the mobile transaction.

9. The one or more computer-readable memories as recited in claim 7, wherein the value share amount of the value of the mobile transaction comprises a percentage of a content purchase price.

10. The one or more computer-readable memories as recited in claim 7, wherein the computer-executable instructions are further executable to generate a graphical interface configured to enable one or more of the value share rules of the set of value share rules to be dynamically reconfigured.

11. The one or more computer-readable memories as recited in claim 10, wherein the graphical interface is configured to enable the one or more of the value share rules of the set of value share rules to be dynamically reconfigured by enabling one or more of rule parameters or rule parameters values associated with the one or more of the value share rules to be changed via input to the graphical interface.

12. The one or more computer-readable memories as recited in claim 7, wherein the computer-executable instructions are further executable to report the value share amount of the value of the mobile transaction to cause an entity associated with the mobile transaction to be credited with the value share amount.

13. A system comprising:
    at least one processor; and
    at least one computer-readable memory storing computer-executable instructions that are executable by the at least one processor to cause the system to:
        receive transaction parameter values for a transaction;
        responsive to receiving the transaction parameter values, access a set of value share rules;
        determine which value share rule of the set of value share rules is a more specific match to the transaction by:
            comparing one or more rule parameter values for each value share rule of the set of value share rules to the transaction parameter values; and
            determining which value share rule of the set of value share rules includes the most rule parameter values that match the transaction parameter values; and
        determine a value share amount of a value of the transaction by applying a determined value share rule to the value of the transaction.

14. The system of claim 13, wherein the transaction comprises a purchase of content via a mobile device.

15. The system of claim 13, wherein the value share amount comprises a percentage of a purchase price of the content.

16. The system of claim 13, wherein the value share amount comprises a tax amount for a purchase price of content.

17. The system of claim 13, wherein the computer-executable instructions are executable by the at least one processor to cause the system to generate a graphical interface configured to enable one or more of the value share rules of the set of value share rules to be dynamically reconfigured.

18. The system of claim 17, wherein the graphical interface is configured to enable the one or more of the value share rules of the set of value share rules to be dynamically reconfigured by enabling one or more of rule parameters or rule parameters values associated with the one or more of the value share rules to be changed via input to the graphical interface.

19. The system of claim 13, wherein the computer-executable instructions are executable by the at least one processor to cause the system to generate a graphical interface configured to report the value share amount of the value of the mobile transaction, and to cause an entity associated with the transaction to be credited with the value share amount.

20. The system of claim 13, wherein the rule parameter values are arranged hierarchically from general rule parameter values to specific rule parameter values.

* * * * *